United States Patent
Coffin et al.

[15] 3,662,389
[45] May 9, 1972

[54] DETERMINATION OF FAR FIELD ANTENNA PATTERNS USING FRESNEL PROBE MEASUREMENTS

[72] Inventors: Robert T. Coffin, Huntsville, Ala.; Raymond W. Grundmeyer, New Orleans, La.; William H. Hefner; Ferd H. Mitchell, both of Huntsville, Ala.

[73] Assignee: International Business Machines Corporation, Armonk, N.Y.

[22] Filed: Apr. 24, 1970

[21] Appl. No.: 31,478

[52] U.S. Cl..................................343/100 AP, 325/67
[51] Int. Cl..............................................G01r 29/10
[58] Field of Search.....................343/100 AP; 325/67

[56] References Cited

UNITED STATES PATENTS 3,166,748  1/1965  Shanks et al.................343/100 AP

*Primary Examiner*—Benjamin A. Borchelt
*Assistant Examiner*—Richard E. Berger
*Attorney*—Hanifin and Jancin and J. Jancin, Jr.

[57] ABSTRACT

Apparatus and method for the design and measurement of microwave antenna wave patterns. The far-field radiation pattern of a space fed aperture antenna is determined as a function of the measured radiation characteristics at the antenna focus and the design or measured illumination characteristics of the feed radiator of the antenna.

2 Claims, 6 Drawing Figures

INVENTORS
ROBERT T. COFFIN
RAYMOND W. GRUNDMEYER
WILLIAM H. HEFNER
FERD H. MITCHELL, JR.

BY

*Edward W Suden*

AGENT 3,662,389

DETERMINATION OF FAR FIELD ANTENNA PATTERNS USING FRESNEL PROBE MEASUREMENTS

BACKGROUND OF THE INVENTION

The present invention relates to the determination of the far field radiation pattern of an antenna. More particularly, to a method and apparatus for determining the far-field pattern by taking measurements at the near field of the antenna and providing an improved method of designing antenna systems.

In the present state of the antenna art, direct measurements of the Fraunhofer, or far-field, radiation pattern of antennas are generally made at distances of $(2D^2)/\lambda$ or greater from the radiation source, where D is the maximum antenna dimension and $\lambda$ is the wavelength of the radiated energy. Due to this distance restriction, it is generally difficult to test and evaluate large microwave antennas because the far-field measurements must be made by providing radiation sources at inconveniently large distances from the antenna. For example, at S-band the far-field antenna pattern data for a 5 × 5 meter lens must be taken at a range greater than 500 meters (approximately one-third of a mile). If the lens is too large to be mobile, then the measurements are made by moving a beacon through the pattern and recording a sequence of field strengths measured at the horn feed. The beacon must be moved each time a new data point is to be obtained, and a large number of points are required to define the main beam and average sidelobes. If the lens is pointed appreciably above the horizon, then altitude restrictions lead to the use of aircraft and complex tracking systems. In this situation, direct measurements in the far field are expensive and require a great deal of sophistication in instrumentation.

Various approaches have been taken in the prior art for determining the far-field radiation pattern of large antennas. One such technique of limited application requires the temporary mechanical focusing of the antenna at a reduced range where measurements are less unwieldly. Another method, which is applicable to horn feed reflectors and lenses, involves the displacement of the feed horn from the antenna focus. This in effect provides a simulation of the far-field pattern at a proportionately reduced distance from the antenna.

Both of the focus and defocus methods achieve some reduction in the necessary measurement distance. However, these methods do not produce sufficient reduction in measurement distance so as to make them advantageous for large arrays.

Other methods of determining the far-field pattern are based on the theoretical knowledge that the radiated field is capable of being expressed in particular series expansion formats. For example, one such method discloses that the coefficients in a series presentation of the far-field pattern are determined by processing amplitude and phase data obtained in the near fields at a convenient distance from the antenna. Subsequent evaluation of this series at points about the antenna results in the actual radiation pattern of the antenna. While this infinite series technique provides for measurement at convenient ranges from the antenna, it also provides a disadvantage in that it requires a voluminous amount of data processing to obtain the far-field pattern.

Another method taught in the prior art for determining the far-field antenna pattern requires measurement of near-field amplitude with a probe whose range from the antenna is time modulated. Data obtained under this method is then electronicaly processed to derive the Fraunhofer pattern of the antenna.

It is therefore primary object of the present invention to improve the methods and apparatus for determining the far-field radiation pattern of large microwave antennas.

Another object of the present invention is to determine far-field radiation patterns of a horn lens or horn reflector antenna from the measured focal plane characteristics of the lens or reflector and the measured amplitude and phase taper of the feed horn.

A further object of this invention is to determine the radiation pattern of a space fed aperture antenna by making amplitude and phase measurements with a probe in the focal plane of the antenna and convoluting the measurements taken at the focus with a weighting function that represents the relationship between the horn feed and the feed probe.

A further object of this invention is to design an antenna system by a convolution process of the antenna focal plane illumination and a weighting function that represents the relationship between the horn feed and the feed probe.

The foregoing and other objects, features and advantages of the invention will be apparent from the following and more particular description of a preferred embodiment of the invention as illustrated in the accompanying drawings.

In accordance with this invention, a method and apparatus is provided for determining the far-field radiation pattern of a space feed aperture antenna, such as horn feed reflectors and lenses, More specifically, apparatus for measuring amplitude and phase relationships at a probe which is placed in the focal plane of the antenna which is to be tested. The antenna is operated as a receiver under the illumination of a transmitter positioned in the far field.

The actual far-field radiation pattern of a space feed aperture is developed by performing a convolution process on two input functions. One of the input functions is a weighting relationship between the feed horn of the antenna and the probe that is utilized in making the amplitude and phase measurements. This weighting relationship function also compensates for errors introduced into the measuring process by means of the probe effects on the field at the focus. The other input function of the convolution process is the actual measured field radiation at the antenna focus. The convolution process provides the actual radiation pattern of the antenna with the specific feed horn represented in the weighting relationship. The actual radiation pattern may be outputted on a standard pattern recorder in the form of a contour map so as to allow for easier analysis of the test data.

This technique of developing the far-field antenna pattern provides two significant advantages over the prior art methods. First, this method may be utilized for the design of a derived horn reflector or lens. By means of this process, the antenna designer would merely try various weighting function inputs into the convolution process until the desired output data pattern is achieved. This design procedure effectively reduces the cost of implementing various designs in an attempt to develop the optimum desired characteristics of the antenna system. The second advantage of this method is that it provides accurate measurement of the far-field response of the antenna with no movement of the radiation source.

DETAILED DESCRIPTION OF THE INVENTION

Figure 1:
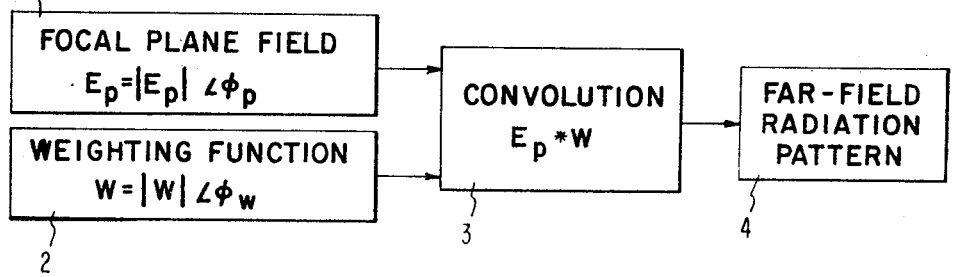
FIG. 1 is a block diagram of the computational flow process which results in the determination of the far-field pattern of the test antenna.

Referring to FIG. 1, there is shown a functional block diagram of the informational flow process for determining the far-field pattern of a test antenna. The $E_p$ function shown in block 1 represents the focal plane field which is detected at the probe present at the focus of the lens under test. The weighting function W shown in block 2 represents the relationship between the illumination function of the probe that is utilized in the test and the actual horn feed that is used in the antenna system. Both of these functions are then mathematically convoluted as shown in block 3 and thereby present an output function representing the actual far field radiation pattern in the form of a contour map as represented by block 4. The mathematical convolution process may be performed on any general purpose information processor such as a digital or analog computer.

Figure 2:
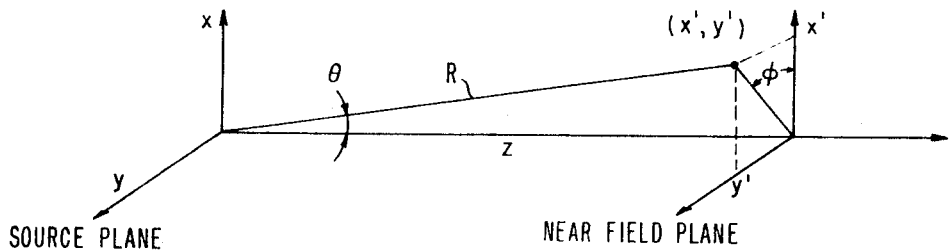
FIG. 2 is a graphical illustration of the source and field coordinate system of the aperture antenna.

Prior to discussing the structural system of the preferred invention, it is helpful to develop the mathematical analysis which forms the basis for the concepts involved in the structural embodiment of the invention. FIG. 2 represents the coordinate systems which will be used as a basis for all notation in the following analysis.

By utilizing scalar field approximations, it is assumed that the illumination field in the aperture plane is zero at all locations except over the aperture area. At the aperture area it is assumed that the field is polarized in one direction and having a wavelength $\lambda$ that is small in comparison to the aperture dimensions. The illumination field at the aperture plane may be described as the product of an amplitude in phase term which may be expressed as:

$$f(x,y) = \begin{cases} |f(x,y)| e^{j\psi(x,y)} & \text{over the aperture} \\ 0 & \text{elsewhere} \end{cases} \quad (1)$$

If the feed illumination has a wavelength $\lambda$, it may be shown by using scalar diffraction theory as disclosed in the text Microwave Antenna Theory and Design by S. Silver, McGraw-Hill Book Co., 1949, that the normalized Fraunhofer field near the aperture axis may be expressed by:

$$E(\mu,\nu) = \int_{\infty}^{\infty} dx \int_{\infty}^{\infty} dy f(x,y) e^{j(\mu x + \nu y)} \quad (2)$$

where: $\mu = k \sin\theta \cos\phi$; $\nu = k \sin\theta \sin\phi$; $k = (2\pi)/\lambda$. That is, the far field of the antenna is the Fourier transform of the aperture illumination field. From a physical standpoint, the exponential term in Eq. 2 represents an additional phase factor that accounts for the inherent path length differences from source points in the aperture plane to the normalized coordinates ($\mu$, $\nu$) in the far field. From Fourier transform theory, it may be shown that the aperture illumination is expressable in the form:

$$f(x,y) = \frac{1}{(2\pi)^2} \int_{-\infty}^{\infty} d\mu \int_{-\infty}^{\infty} d\nu E(\mu,\nu) e^{-j(\mu x + \nu y)} \quad (3)$$

Thus, it is seen that the field $E(\mu, \nu)$ *and the illumination function* $f(x,y)$ form a Fourier transform pair as defined by Eq.'s 2 and 3.

In order to minimize error and facilitate measurements, the primary feed source is generally designed to present a spherical or cylindrical wave front over the aperture. This wave front must then be altered by means of the lens so as to introduce a resultant phase distribution over the aperture which varies in a specified manner. The lens or reflector introduces this additional phase and presents a resultant constant phase distribution over the aperture. Assuming that the cross polarization effects are negligible the behavior of the lens or reflector may be characterized by the term:

$$H(x,y) = |H(x,y)| e^{j\phi(x,y)} \quad (4)$$

Thus, with the feed horn illumination of
$$f_h(x,y) = |f_h(x,y)| e^{j\psi h(x,y)}$$
the far field of the antenna over the aperture is represented by:

$$E(\mu,\nu) = \int_{\infty}^{\infty} dx \int_{\infty}^{\infty} dy f_h(x,y) H(x,y) e^{j(\mu x + \nu y)} \quad (5)$$

The field $E(\mu, \nu)$ as expressed in Eq. 5 is determined from the measured data in the following manner.

By using a transmitter located in the far field, it may be assumed that the antenna is illuminated with a uniform plane wave. Then, amplitude and phase measurements may be made in the focal plane of the lens or reflector by using a small probe such as a dipole. The data which is detected by the small probe is represented by $E_p$ (focal plane). Now making use of the theorem by J. W. Sherman as disclosed in the article entitled "Properties of Focus Apertures and the Fresnel Region", IRE Transactions on Antennas and Propagation, July 1962, pp. 399–408, we know that in the focal plane near the axis, the electric field of a focused aperture has all the properties of the far field. This may be expressed in the form:

$$E_p(\text{far field}) = E_p(\text{focal plane}) \quad (6)$$

Now considering that all measurements were made by use of a probe which has introduced some error into measurements, it is necessary to develop some sort of relationship between the probe that is utilized and the feed horn under operational use. If the probe which is used for the measurement has aperture illumination expressed as
$$f_p(x,y) = |f_p(x,y)| e^{j\psi p(x,y)},$$
then by using Eq. 6, the field measured in the focal plane may be expressed as:

$$E_p(\mu,\nu) = \int_{\infty}^{\infty} dx \int_{\infty}^{\infty} dy f_p(x,y) H(x,y) e^{j(\mu x + \nu y)} \quad (7)$$

From Eq. 7 it is then possible to develop the actual field of the antenna from the measured field $E_p(\mu,\nu)$. This is achieved by introducing a function $W(\mu,\nu)$ defined as follows:

$$W(\mu,\nu) = \int_{\infty}^{\infty} dx \int_{\infty}^{\infty} dy \frac{f_h(x,y)}{f_p(x,y)} e^{j(\mu x + \nu y)} \quad (8)$$

where $f_h(x,y)$ and $f_p(x,y)$ represent the horn and probe illumination field in Eq.'s 5 and 7.

Fourier inversion of Eq.'s 7 and 8 (in accordance with Eq.'s 2 and 3) yields the following results:

$$f_p(x,y) H(x,y) = \frac{1}{(2\pi)^2} \int_{\infty}^{\infty} d\mu \int_{\infty}^{\infty} d\nu E_p(\mu,\nu) e^{-j(\mu x + \nu y)} \quad (9)$$

$$\frac{f_h(x,y)}{f_p(x,y)} = \frac{1}{(2\pi)^2} \int_{\infty}^{\infty} d\mu \int_{\infty}^{\infty} d\nu W(\mu,\nu) e^{-j(\mu x + \nu y)} \quad (10)$$

It may be seen that the product of Eq.'s 9 and 10 yields the effective illumination of horn feed antenna as expressed in Eq. 5. That is, from Eq.'s 9 and 10 the following expression is derived:

$$f_h(x, y) H(x, y)$$
$$= \frac{1}{(2\pi)^4} \int_{-\infty}^{\infty} dx \int_{-\infty}^{\infty} dy \int_{-\infty}^{\infty} d\mu' \int_{-\infty}^{\infty} d\nu' \int_{-\infty}^{\infty} d\mu'' \int_{-\infty}^{\infty} d\nu''$$
$$\{E_p(\mu', \nu') W(\mu'', \nu'') \cdot e^{j[(\mu'+\mu'')x + (\nu'+\nu'')y]}\} \quad (11)$$

By making use of the inversion property $$\frac{1}{(2\pi)^2} \int_{-\infty}^{\infty} dx \int_{-\infty}^{\infty} dy e^{j(px+qy)} = \delta(p) \delta(q)$$

Eq. 11 may be reduced to the general form:

$$E(\mu, \nu) = \int_{-\infty}^{\infty} d\mu' \int_{-\infty}^{\infty} d\nu' \int_{-\infty}^{\infty} d\mu'' \int_{-\infty}^{\infty} d\nu''$$
$$E_p(\mu', \nu') W(\mu'', \nu'') \delta(\mu - \mu' - \mu'') \delta(\nu - \nu' - \nu'') \quad (12)$$

where $\delta$ is the Dirac delta function.

By now integrating with respect to the variables $\mu''$ and $\nu''$ a final expression is derived which represents the actual field of the antenna and is expressed in the form:

$$E(\mu, \nu) = \int_{-\infty}^{\infty} d\mu' \int_{-\infty}^{\infty} d\nu' E_p(\mu', \nu') W(\mu - \mu', \nu - \nu') \quad (13)$$

Thus, it is seen that the actual far-field $E$ is the convolution of the measured focal plane's field $E_p$ and the weighting function $W$. This may be symbolically expressed in the form $E = E_p * W$.

Figure 3:
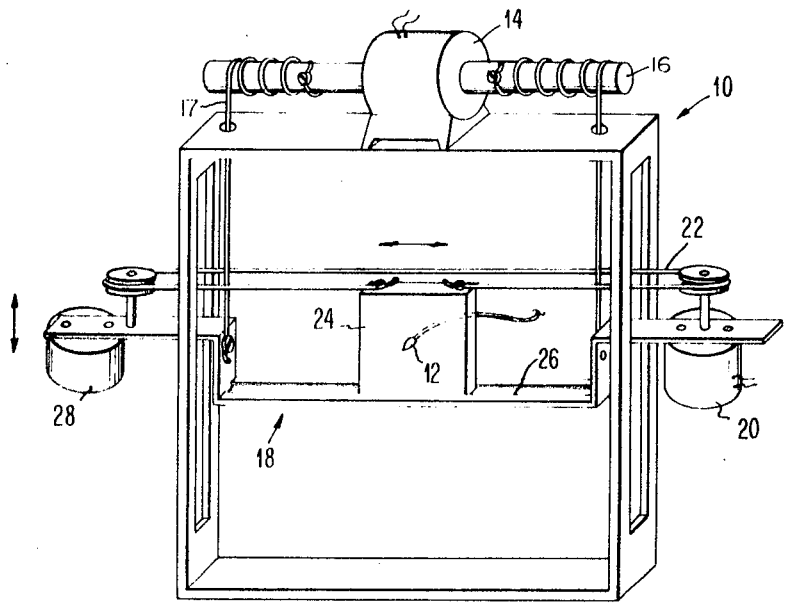
FIG. 3 is a particular embodiment of a coordinate frame having a positionable probe mount.

Referring now to FIG. 3, there is shown a coordinate frame and positional probe mount for taking measurements of the field at the focus of the antenna lens. As previously discussed, the transmitter is used to illuminate the antenna from a point in the far field and the probe is used to sample the received field in the focal plane of the antenna. In general, the transmitter is mounted on an elevated point or plateform in the far field of the antenna. The probe may be of various designs such as a dipole, loop, or horn. However, the probe should be of a sufficiently small dimension so that effective point measurements of the field may be obtained. This is due to the fact that the probe introduces distortion in the field that is being sampled and must therefore be designed to keep the distortion localized. The coordinate frame structure shown in FIG. 3 must be of non-metallic materials so as to minimize perturbation of the field. The frame 10 of the coordinate structure serves as a housing for a positionable $x,y$ coordinate variation of the probe. Positioning of the probe 12 in the $y$ axis is accomplished by D. C. motor 14 which rotates shaft 16 which in turn coils nylon cable 17 so as to move a support member 18 in the $y$ direction. D. C. motor 14 is controlled by operator switch means not shown.

Positioning of the probe in the $x$ direction is accomplished by means of energizing motor 20 which directs movement of the cable pulley system 22 to move the probe assembly 24 within track 26. Element 28 serves as a balancing weight for motor 20.

The probe 20 is mounted on a probe assembly 24 which acts as an electromagnetic absorber in order to eliminate field reflections from the cables within the frame. It will be recognized by those skilled in the art that this frame structure is not unique and other embodiments for positioning $x$ and $y$ movement of the probe may be utilized. Similarly, the cartesian coordinate system implied in the frame structure of FIG. 3 is not considered to be limiting. Arrangements which are based on other coordinate systems are equally possible.

Figure 4:
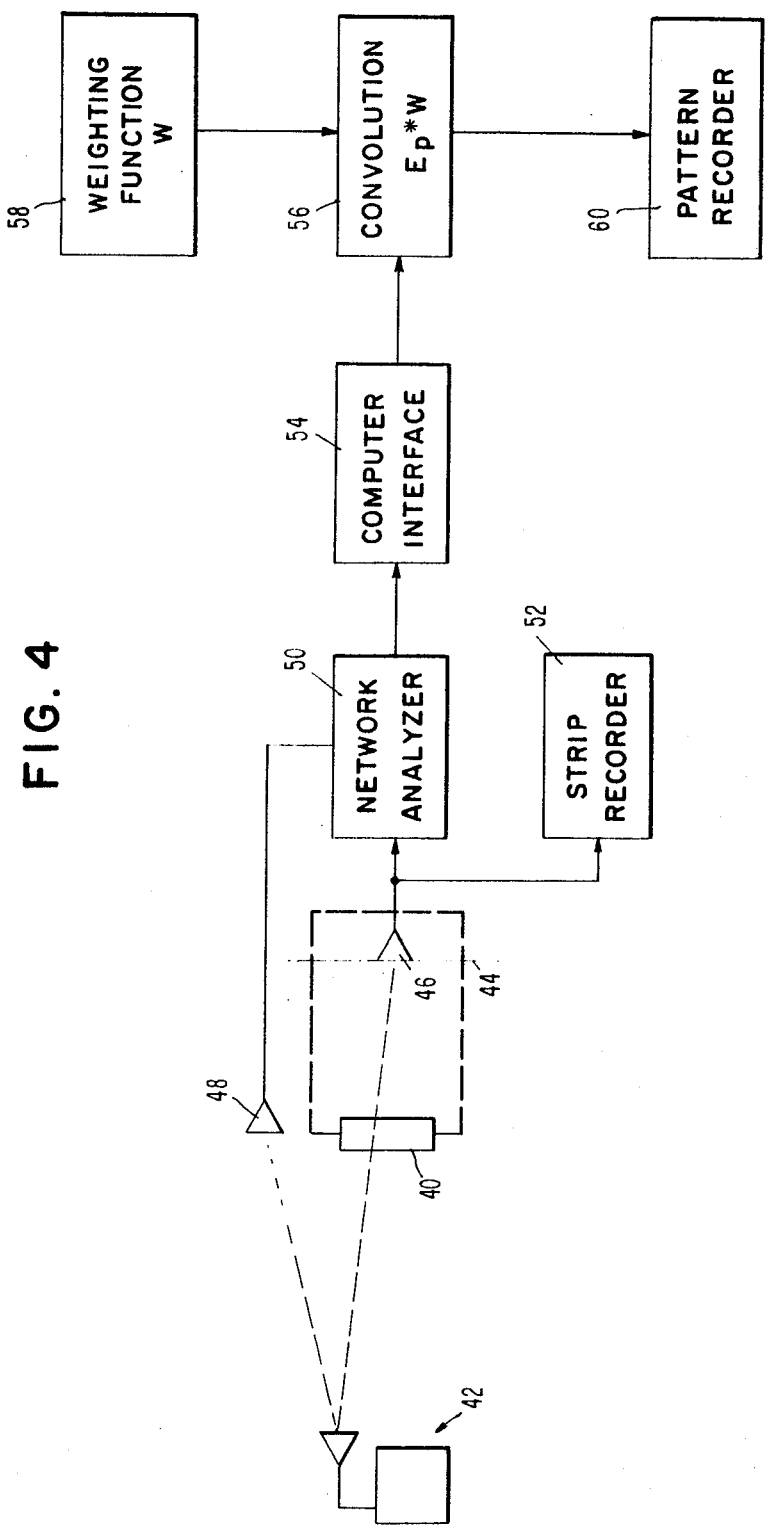
FIG. 4 is a block diagram of the system embodiment of the invention.

Referring now to FIG. 4, there is shown a system block diagram of the preferred invention. This arrangement shows a focusing means which is represented by lens element 40. The lens 40 collimates the wave front signal received from transmitting source of wave energy 42 by focusing the received signal at a point on plane 44. At this focal plane, the first receiving means represented as sampling probe 46 is positioned by means of the frame system of FIG. 3. The sampling probe which may be a dipole, loop or equivalent sensor device is used to detect illumination at the focal plane 44. A second receiving means represented as a standard horn feed 48 is positioned adjacent to the network analyzer 50. The network analyzer 50 creates an output signal representative of the sampling that is detected at probe 46. The standard horn feed 48 input into the analyzer provides a reference for amplitude and phase and appropriate adjustment is made by the analyzer. The output of probe 46 is also introduced into strip recorder 52. This recorder is utilized for operator monitoring of the system and provides a visual check on the signal that is being received at probe 46. The signal output of network analyzer 50 is passed through a signal transducer means shown as computer interface 54 which is a standard analog to digital converter. Conversion is necessary so as to make the sampled data compatible with a general purpose digital processor. If alternative computational systems are used such as an analog device, the conversion from analog to digital would be substituted by an analog to analog converter. The digital data representative of the sampled information at probe 46 serves as one of the inputs into the mathematical convolution process which is performed by any commercially known general purpose computer and is shown by representative processor block 56. The other input into the convolution function is a weighting function 58 which is stored in a conventional data store such as a tape drive or disc storage device. The weighting function 58 provides the relationship between the feed horn of the antenna and the probe 46 that is utilized in detecting the field illumination at the focus. The convolution process utilizes the information from the weighting function and the data pattern representative of the actual far-field response of the antenna which comprises lens 40 and a horn feed which would be in place of probe 46. The pattern recorder 60 receives the output from the convolution process 56 and provides a hard copy output of the far-field response of the antenna system under test. For best ease in analysis of the data, the output is generated in the form of a contour map. However, other output devices such as a conventional output printer to a computer system may be used for developing output data representative of field values.

Figure 5:
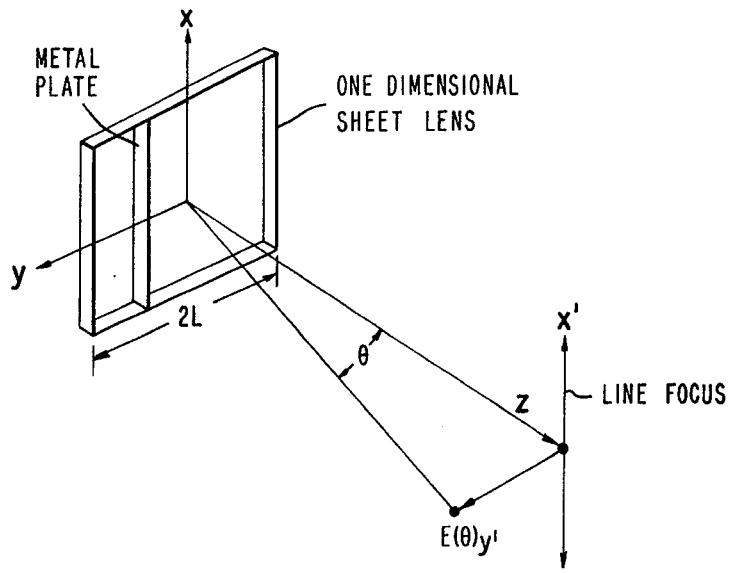
FIG. 5 is an illustration of the antenna lens coordinate system.
Figure 6:
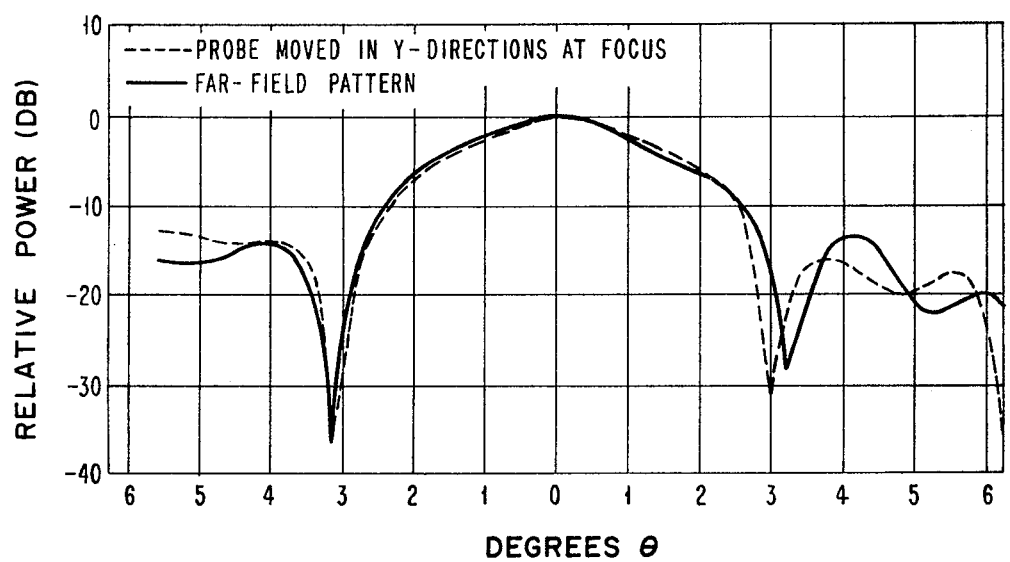
FIG. 6 is a contour map showing the far-field radiation pattern in comparison to the Fresnel probe radiation pattern.

With reference to FIGS. 5 and 6, there is illustrated an example of the far-field response of a one-dimensional sheet lens antenna system. The choice of using a one-dimensional sheet lens was made so as to simplify the calculations in this illustrative example by eliminating the x coordinate variable from the equations. FIG. 5 shows the reference coordinate system used in determining the weighting function $W$.

By means of the coordinate form assembly shown in FIG. 3, the probe is moved in the $y$ direction. Movement of the probe is indicated by the incremental changes in $\delta$ shown on the DEGREE abscissa in FIG. 6.

Referring to FIG. 6, there is shown a comparison of the focal plane response sensed by the probe, and the far-field response of the antenna as drawn by the pattern recorder 60, indicated as a solid line. The focal plane response was measured by means not shown and is illustrated in the chart merely for the purpose of comparison.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for determining the far-field radiation pattern of a space fed aperture antenna comprising:
   a source of wave energy;
   focusing means for producing a desired phase variation across an electromagnetic wave front so that the wave energy is collimated to a point;
   first receiving means positioned at said collimated point for detecting said wave energy and providing a first output signal, said focusing means fully includes positioning means for moving said first receiving means in a plurality of coordinate directions;
   signal transducer means for converting said first signal output into a processable signal data stream;
   storage means for maintaining a weighting function data output representing the relationship between the amplitude and phase properties of said first receiving means and an alternate receiving means;
   convolution processing means for performing a convolution on the outputs received from said store means and said transducer means and producing an output signal representative of the far-field radiation pattern of said space fed aperture antenna.

2. The process for determining the far-field radiation pattern of a space fed aperture antenna comprising the steps of:
   generating wave energy;
   focusing said energy so as to produce a desired phase variation across an electromagnetic wave front so that the wave energy may be collimated to a point;
   detecting said wave energy at said collimated point and generating a first output signal representative of said detected wave energy;
   generating a weighting function signal dependent on the amplitude and phase properties of a probe detector receiving said weighting function and said first output signal and performing a convolution process to determine the far-field radiation pattern of said antenna.

* * * * *